(12) United States Patent
Kim et al.

(10) Patent No.: US 7,003,227 B2
(45) Date of Patent: Feb. 21, 2006

(54) NODE STRUCTURE OF UPGRADABLE WAVELENGTH DIVISION MULTIPLEXING SYSTEM

(75) Inventors: Kwan-Lae Kim, Suwon-shi (KR); Shin-Hee Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 09/748,430

(22) Filed: Dec. 26, 2000

(65) Prior Publication Data
US 2001/0015836 A1    Aug. 23, 2001

(30) Foreign Application Priority Data
Dec. 28, 1999   (KR)   ................................ 1999-64110

(51) Int. Cl.
*H04B 10/00*    (2006.01)
(52) U.S. Cl. .......................................... 398/82; 398/79
(58) Field of Classification Search ............... 359/584, 359/577, 589; 398/79–88
See application file for complete search history.

(56) References Cited

U.S. PATENT DOCUMENTS
6,341,040 B1 *   1/2002   Tai et al. ..................... 359/584

\* cited by examiner

*Primary Examiner*—Agustin Bello
(74) *Attorney, Agent, or Firm*—Cha & Reiter, L.L.C.

(57) ABSTRACT

Disclosed is a node structure of an upgradeable wavelength division multiplexing system that can minimize the expense in implementing, maintaining, and upgrading the system. The node structure includes an interleaver for interleaving a plurality of optical signals received therein into a predetermined number of channels; at least one demultiplexer coupled to one of the output channels for demultiplexing the optical signals received thereto into a prescribed number of channels; at least one multiplexer for multiplexing the respective demultiplexed optical signals from the demultiplexer; and, a deinterleaver for deinterleaving the optical signals outputted from the multiplexer to be forwarded to the next node.

15 Claims, 7 Drawing Sheets

NODE STRUCTURE OF UPGRADABLE WAVELENGTH DIVISION MULTIPLEXING SYSTEM

CLAIM OF PRIORITY

This application makes reference to, incorporates the same herein, and claims all benefits accruing under 35 U.S.C. Section 119 from an application for "Node Structure of Upgradeable Wavelength Division Multiplexing System," filed earlier in the Korean Industrial Property Office on Dec. 28, 1999 and there duly assigned Ser. No. 99-64110.

BACKGROUND OF THE INVENTION

1. Field of the Invention

The present invention relates to an optical communication, and more particularly to a wavelength division multiplexing system that can transmit a plurality of channels through an optical fiber.

2. Description of the Related Art

A wavelength division multiplexing (WDM) system provides simultaneous transmission of optical signals with a plurality of different wavelengths via an optical fiber. In the WDM system, the transmission of a large quantity of information at a faster transmission rate is possible by employing an optical fiber as the transmission medium. However, the WDM system has some drawbacks in that the provision of upgrading the transmission capacity to accommodate a growing number of nodes with variable data size.

FIG. 1 is a simplified block diagram illustrating the node structure of the WDM system according to a conventional system. As shown in FIG. 1, the mechanism used for upgrading the transmission capacity of the WDM system is achieved by providing a scalable multiplexer 20 and demultiplexer 10 which can accommodate additional channels in the future. Although such a system is initially built with adequate space to add more channel capacity later, it is very costly to install both the multiplexer 20 and the demultiplexer 10 with such a capacity. Moreover, the system is not utilized efficiently in the most instances as most of the extendable capacity is not typically used. Furthermore, it is difficult to predict the optimal size of the multiplexer 20 and the demultiplexer 10 that can be fully utilized in unforeseeable future.

FIG. 2 is another simplified block diagram of a prior art illustrating the node structure of the WDM system. As shown in FIG. 2, the mechanism for upgrading the transmission capacity of the WDM system is accomplished by replacing the current multiplexer and demultiplexer with a new multiplexer 40 and demultiplexer 30 with the additional necessary channel capacities. Although this system saves the cost of installing a large system as mentioned in the preceding paragraphs, there are additional costs involved for replacing the old components with the new multiplexer 40 and demultiplexer 30. Also, it is not economical to replace the old devices whenever a system upgrade is necessary. Moreover, there is a drawback in this type of upgrading method as the service has to be interrupted when replacing the old components.

FIG. 3 is a simplified block diagram illustrating the node structure of the WDM system according to anther prior art. As shown in FIG. 3, the mechanism for upgrading the transmission capacity of the WDM system is achieved by adding a pair of multiplexer 80 demultiplexer 70 on each port using an optical strength dividing device, such as optical couplers 50 and 60. Compared to the previous methods, this method provides a cost saving means to upgrade the transmission capacity as it does not require replacing any components in the existing system. Rather, it merely adds additional components to the existing system by adding the ports 52 and 62. However, there is still a drawback in that the power loss as a result of dividing the initial power via the optical couplers is increased as more channels are being serviced within the system.

SUMMARY OF THE INVENTION

It is, therefore, an object of the present invention to provide a node structure that is upgradable in the WDN system which can minimize the expense associated with maintaining and upgrading the system in the future.

Another object of the present invention is to provide a node structure that is upgradable in the WDM system in a simpler manner and prevent power loss associated with the upgrading process.

BRIEF DESCRIPTION OF THE DRAWINGS

The above objects, features, and advantages of the present invention will become more apparent from the following detailed description when taken in conjunction with the accompanying drawings, in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. For the purpose of clarity, detailed descriptions of well-known devices, circuits, and methods are omitted so as not to obscure the description of the present invention with unnecessary detail.

Figure 1:
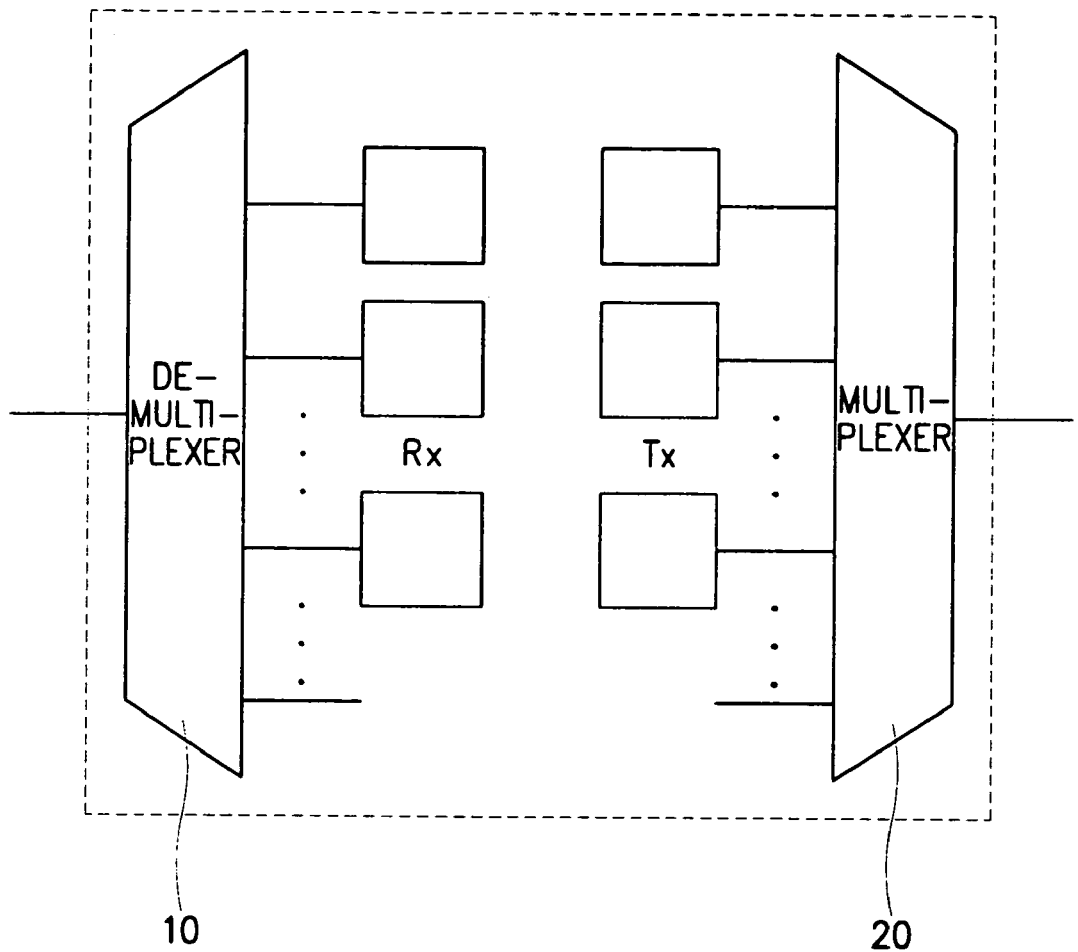
FIG. 1 is a block diagram illustrating a node structure of the WDM system of a related art.
Figure 2:
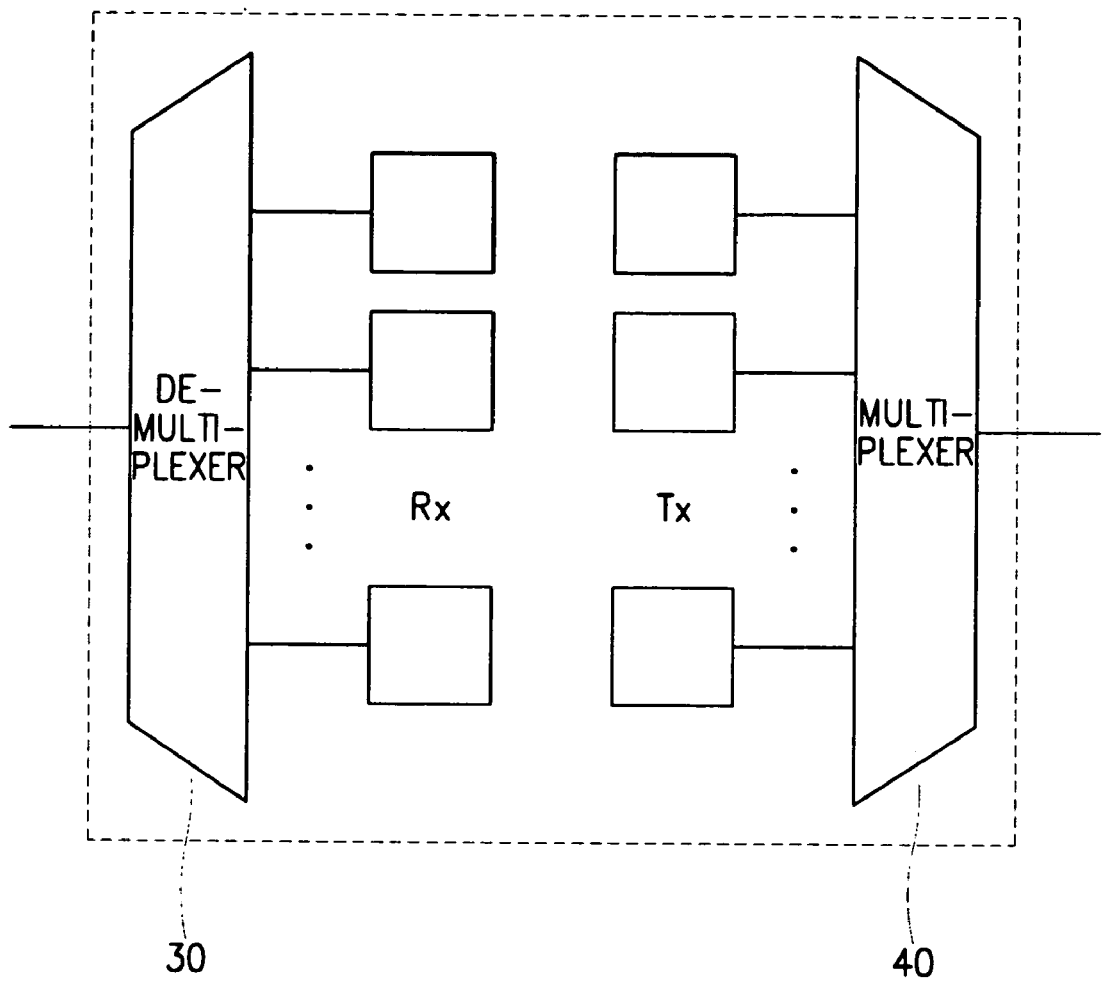
FIG. 2 is a block diagram illustrating a node structure of the WDM system of a related art.
Figure 3:
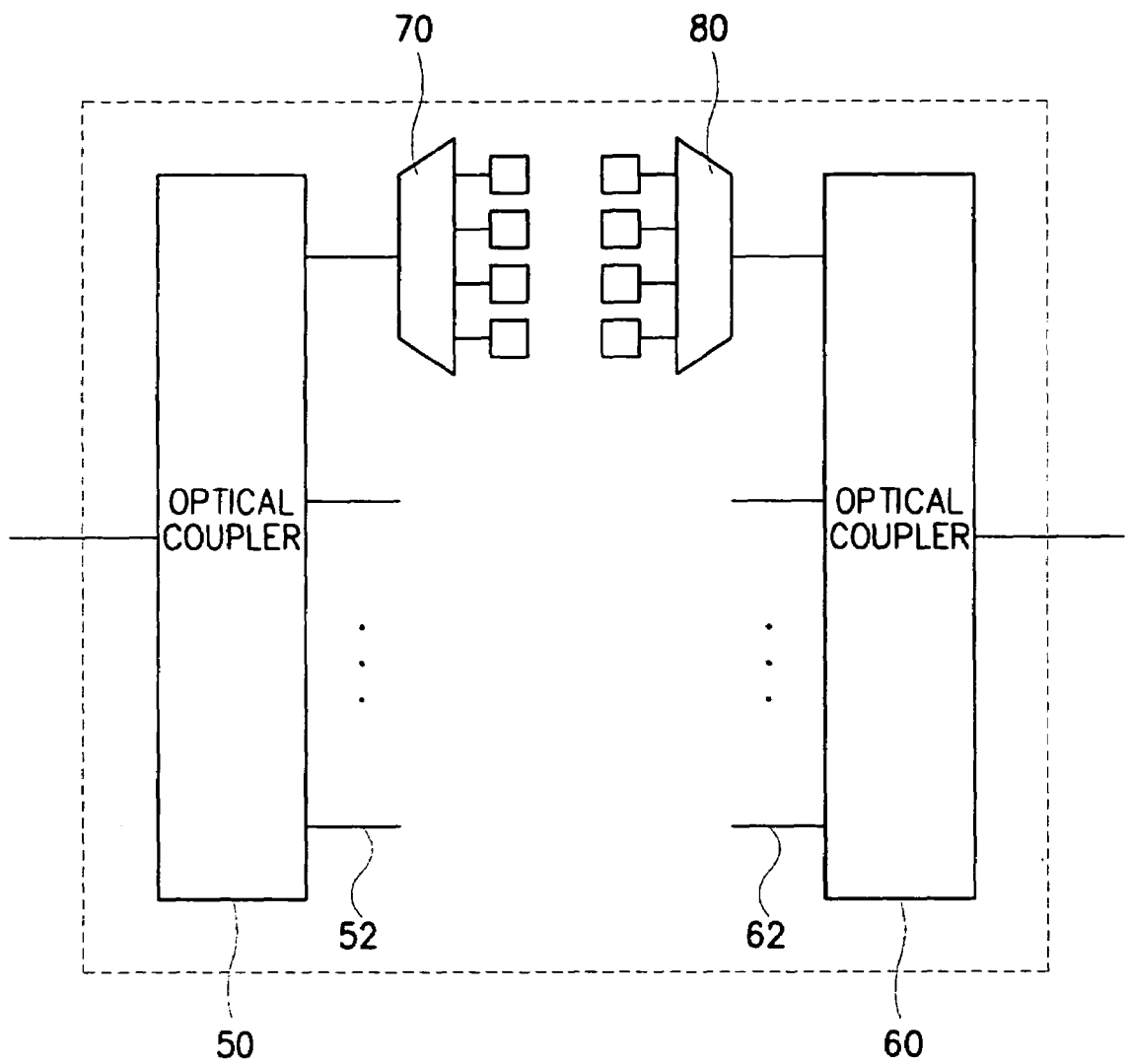
FIG. 3 is a block diagram illustrating a node structure of the WDM system of another related art.
Figure 4:
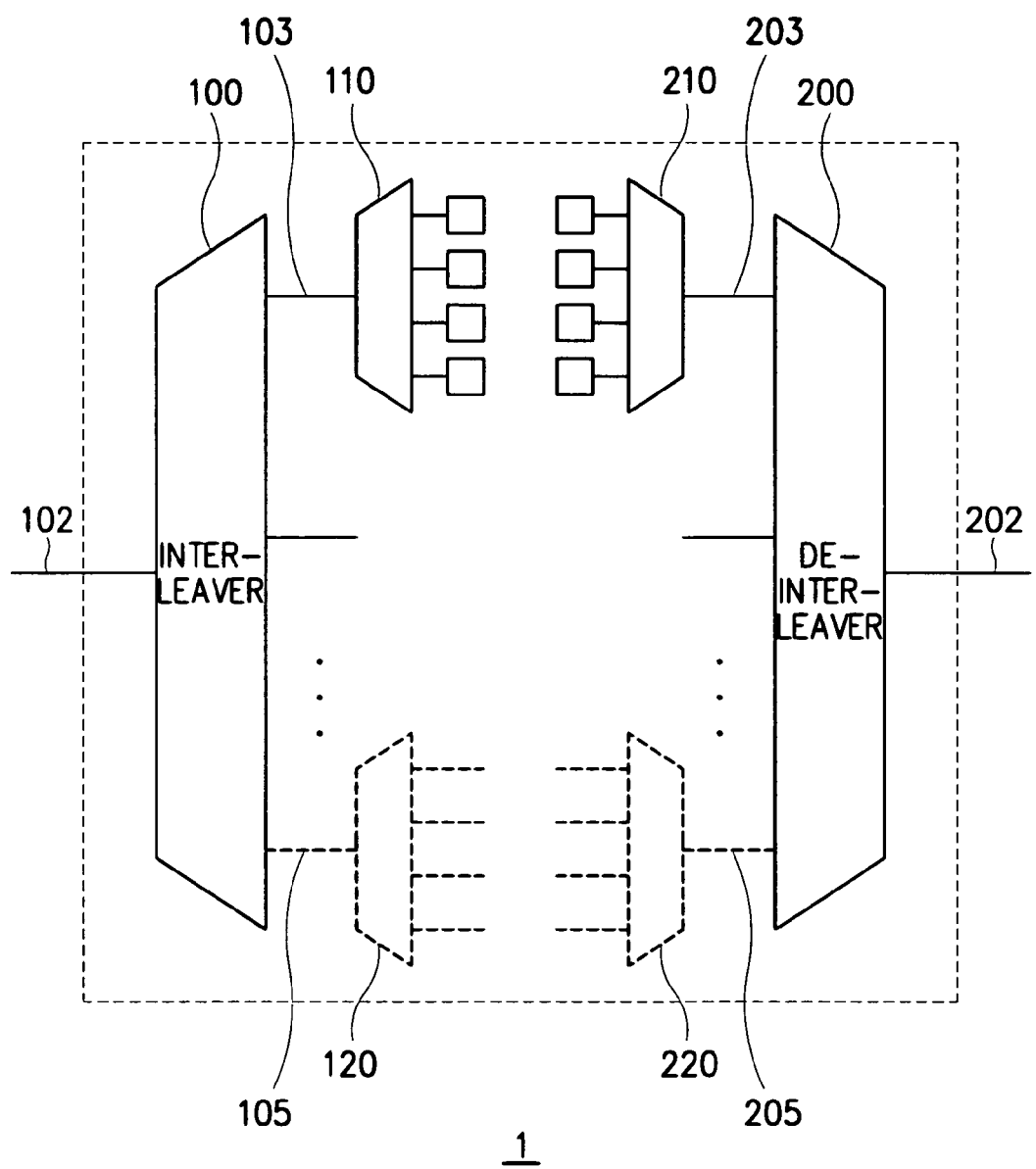
FIG. 4 is a block diagram illustrating the node structure of the WDM system according to a preferred embodiment of the present invention.

FIG. 4 is a block diagram illustrating the node structure of the WDM system according to a preferred embodiment of the present invention. The major components of node 1 includes an interleaver 100, a demultiplexer 110, an upgradable demultiplexer 120, a multiplexer 210, an upgradable multiplexer 220, and a deinterleaver 200. The interleaver 100 interleaves and outputs each channel signal in a predetermined channel order starting with the lowest wavelength when optical signals with a plurality of channels are multiplexed thereto. The interleaver 100 has at least one output terminal 105 for future upgrading purposes. The upgradeable demultiplexer 120, which will be added in the future when more capacity is required, will be coupled to the output terminal 105. The interleaver 100 outputs the interleaved channel through both the presently active output terminals 103 and 105, if necessary. In response to the optical signals transmitted from the interleaver 100 via the output terminal 103, the demultiplexer 110 demultiplexes the received optical signals into different channels and then outputs them to the respective input terminal of the multiplexer 210. Similarly, if more transmission capacity is needed, an additional demultiplexer 120 is provided to demultiplex and output the received optical signals via the output terminal 105.

Thereafter, the multiplexer 210 multiplexes the optical signals and outputs the multiplexed signals to the input terminal 203 of the deinterleaver 200. The deinterleaver 200 deinterleaves the optical signals outputted from the multiplexer 210 and forwards them to the next node. The deinterleaver 200 includes at least one input terminal 205 in the event that more capacity is needed. If the output terminal 205 is connected to the upgradable multiplexer 220, the deinterleaver 200 deinterleaves the optical signal channels received through the input terminal 205 and then outputs them to the next node via the output terminal 202. Accordingly, one or more multiplexer 220 is also selectively connected to the input terminal 205 so as to extend the transmission capacity in the future.

Figure 5:
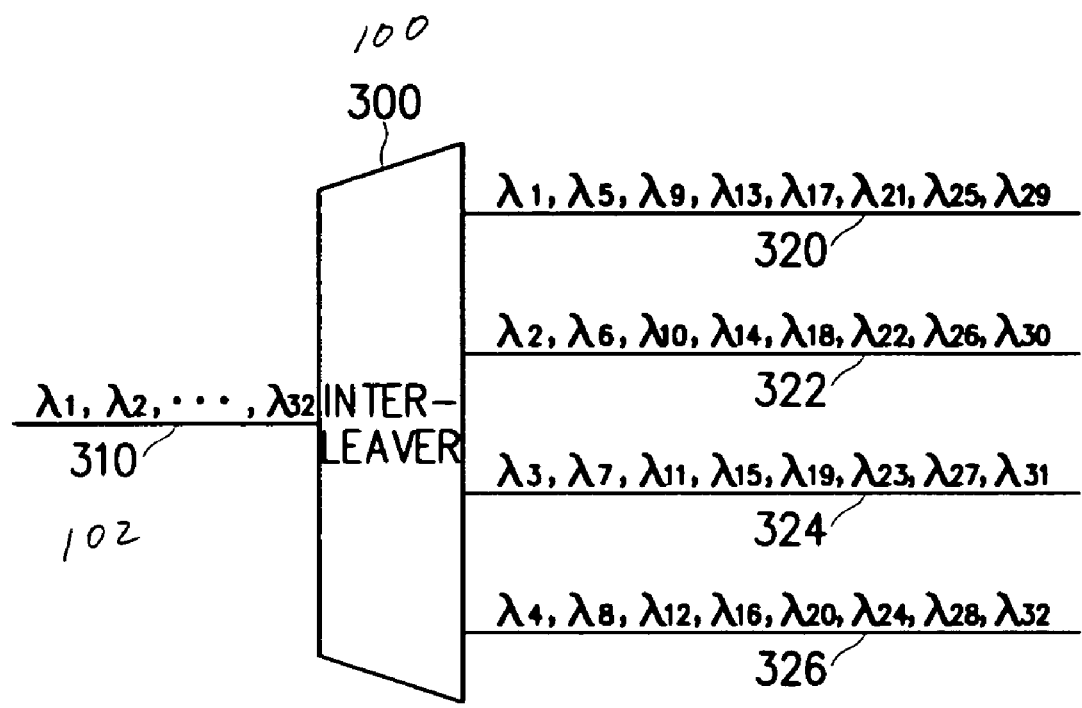
FIG. 5 is a block diagram illustrating an interleaver according to the present invention.

The function of the interleaver according to the present invention will be described with reference to FIG. 5. A 1×4 interleaver 300 having one input terminal 310 and four output terminals 320, 322, 324, and 326 is deployed in the present invention. However, it should be noted that a different combination of interleavers with different numbers of output terminals can be used in the present invention. The interleaver 300 is an optical element and serves to place a plurality of optical signals with a constant wavelength interval from many signal sources on one transmission channel and then outputs them in a prescribed order into a plurality of different channels. For example, as shown in FIG. 5, if 32 channels with a constant wavelength interval are inputted through the input terminal 310 of the 1×4 interleaver 300, channel signals having an order of $\lambda_1$, $\lambda_5$, $\lambda_9$, and $\lambda_{13}$ are outputted through the first output terminal 320 due to the nature of the 1×4 interleaver 300. Similarly, channel signals having an order of $\lambda_2$, $\lambda_6$, $\lambda_{10}$, and $\lambda_{14}$ are outputted through the second output terminal 322; channel signals having an order of $\lambda_3$, $\lambda_7$, $\lambda_{11}$, and $\lambda_{15}$ outputted through the third output terminal 324; and channel signals having an order of $\lambda_4$, $\lambda_8$, $\lambda_{12}$, and $\lambda_{16}$ are outputted through the forth output terminal 326, respectively. Similarly, the deinterleaver functions as the interleaver 300 in a reverse direction, thus the discussion will be omitted.

The node structure of the WDM system according to the present invention is characterized so that a pair of interleaver 110 and deinterleaver 210 is provided on the sending and receiving ends, respectively. Then, additional pairs of the demultiplexer and multiplexer are subsequently added in the system.

Figure 6:
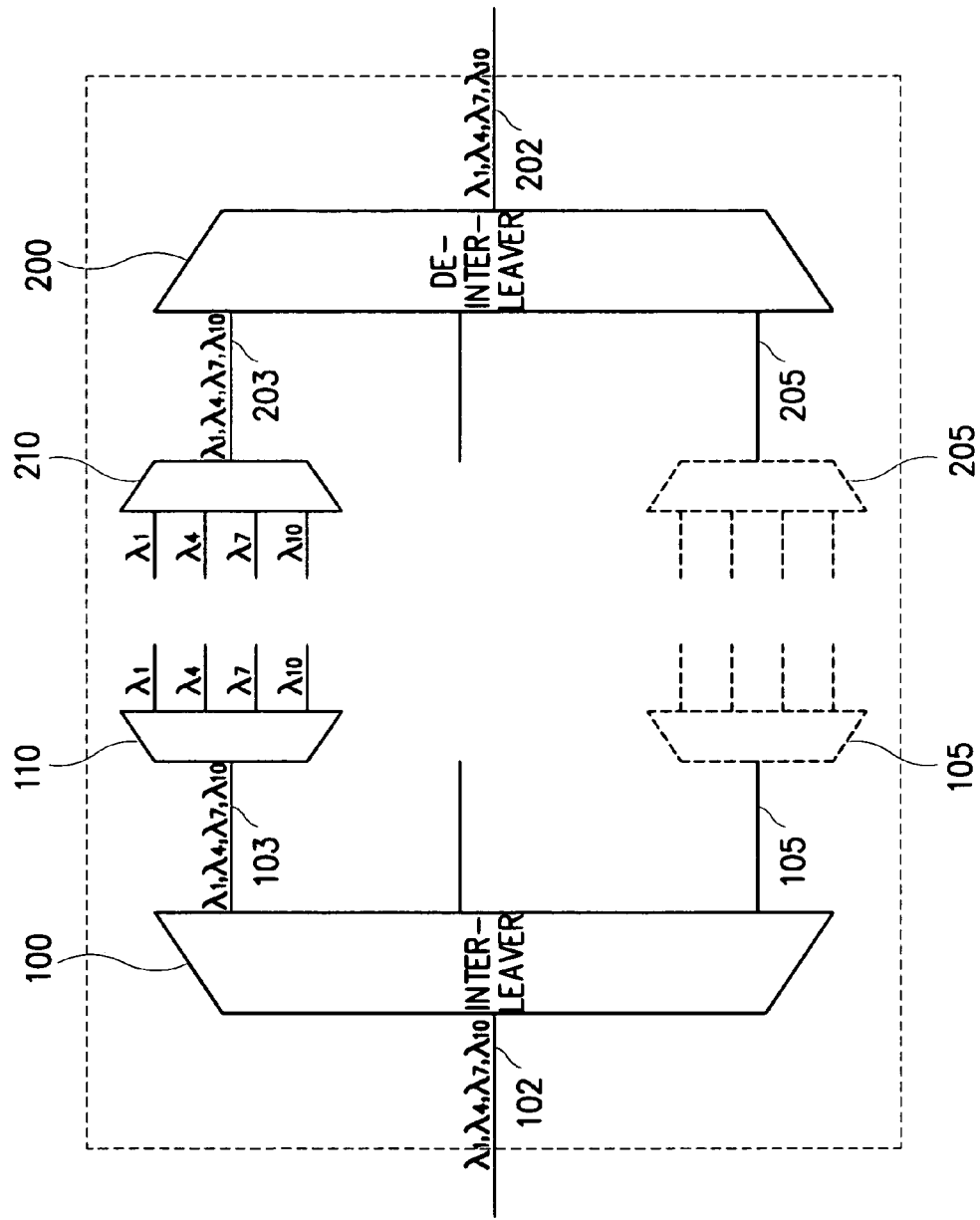
FIG. 6 is a block diagram illustrating the node structure of the WDM system when the upgrading is not performed according to the present invention; and, FIG. 7 is a block diagram illustrating the node structure of the WDM system when the upgrading is executed according to the present invention.

FIG. 6 is a simplified block diagram illustrating the node configuration of the WDM system prior to adding extra system capacity. As shown in FIG. 6, the WDM system node includes the demultiplexer 110 and the multiplexer 210 on the output terminal 102 of the interleaver 100 and the input terminal 202 of the deinterleaver 200, respectively. Accordingly, when the optical signal from multiple sources are inputted through the input terminal 102 of the interleaver 100, the inputted optical signals are forwarded to the demultiplexer 110 via the output terminal 103 of the interleaver 100. The optical signals are demultiplexed through different channels by the demultiplexer 110, then outputted through each output terminal of the demultiplexer 110. Next, these outputted channels are inputted to the multiplexer 210 to the corresponding input terminal of the multiplexer 210, and thereafter multiplexed by the multiplexer 210. The multiplexed signals are forwarded to the deinterleaver 200 through the input terminal 203 and then deinterleaved into one optical fiber transmission by the deinterleaver 200. Finally, the deinterleaved signals are transferred to the next node through the output terminal 202.

Figure 7:
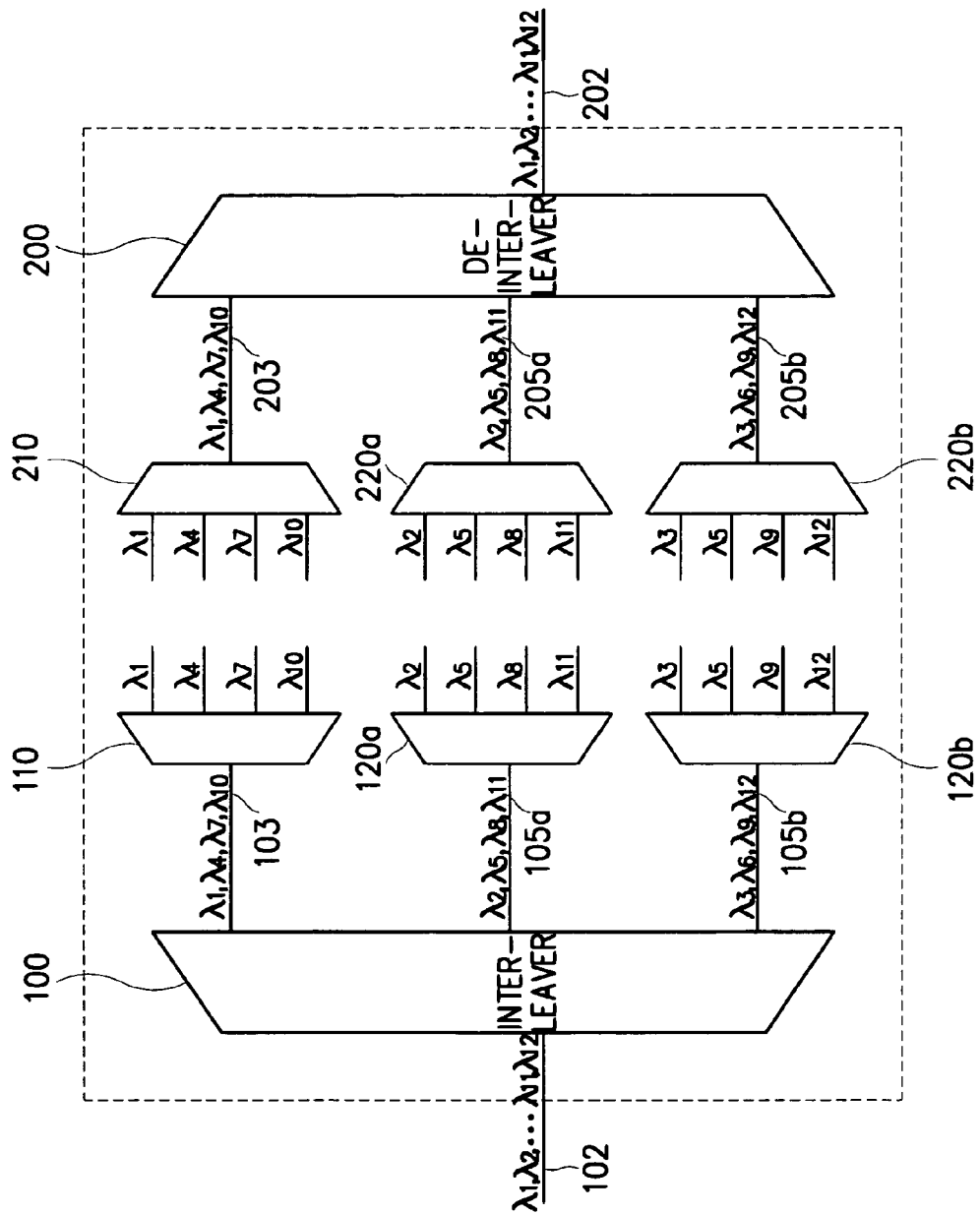

FIG. 7 is a simplified block diagram illustrating the node configuration after additional capacity is added according to the present invention. The optical signal with 4 different signal channels is inputted to the node in FIG. 6, whereas the optical signal with 12 different signal channels is inputted after increasing the channel capacity to accommodate eight more channels in FIG. 7. The WDM system node basically includes the demultiplexer 110 and the multiplexer 210 on the output terminal 103 of the interleaver 100 and the input terminal 203 of the deinterleaver 200, respectively. Furthermore, the node includes additional pairs of demultiplexer 120a and 120b and multiplexer 220a and 220b coupled to the respective output terminals 105a and 105b of the interleaver 100 and the respective input terminals 205a and 205b of the deinterleaver 200.

Accordingly, as shown in FIG. 7, when the optically multiplexed 12 channels with a constant interval is inputted through the input terminal 102 of the interleaver 100, the optical signal is interleaved in a predetermined order within the interleaver 100 and then inputted to the demultiplexer 110 and the demultiplexer 210. Similarly, the inputted optical signal inputted to both the demultiplexer 120a and 120b are demultiplexed in different channels and outputted to the corresponding multiplexer 220a and 220b through the respective output terminal of the demultiplexer 120a and 120b. Thereafter, the demultiplexed optical signals are inputted to the multiplexer 220a and 220b, then multiplexed by the multiplexer 210. The multiplexed signals are inputted to the deinterleaver 200 through the respective input terminals 205a and 205b of the deinterleaver 200. Finally, the optical signal are deinterleaved into one optical transmission channel by the deinterleaver 200 and then transferred to the next node via the output terminal 202.

As described above, the node structure according to the present invention provides an effective way of accommodating additional system capacity, thus eliminating the costly maintenance and upgrading needed in the prior art system. In addition, the present invention upgrades the existing system without the power loss typically involved in the prior art method.

While the invention has been shown and described with reference to certain preferred embodiments thereof, it will be understood by those skilled in the art that various changes in form and details may be made there in without departing from the spirit and the scope of the invention as defined by the appended claims.

What is claimed is:

1. A node system for increasing capacity of a wavelength division multiplexing (WDM) system, said node system comprising: means for interleaving a plurality of optical signals received therein into a predetermined number of channels having respective outputs, said means having at least one preliminary output terminal for respectively outputting an output of said outputs; at least one demultiplexer respectively coupled to another of said outputs and for demultiplexing said optical signals received via said another of said outputs into a prescribed number of channels; at least one multiplexer for multiplexing the respective demultiplexed optical signals outputted from the prescribed channels of said demultiplexer; means for deinterleaving the optical signal outputted from said multiplexer to be forwarded to a next node; at least one upgrading demultiplexer for demultiplexing the optical signal outputted from the respective preliminary output terminal; and at least one upgrading multiplexer for multiplexing the demultiplexed optical signal outputted from the respective upgrading demultiplexer, wherein the preliminary output terminal is without forward connection, is for outputting at least an additional channel for an additional, interleaved optical signal, and is coupled to a respective demultiplexer of the at least one upgrading demultiplexer in the event the system is expanded so as to provide said forward connection.

2. The node system of claim 1, further comprising, coupled to the deinterleaving means, an input terminal without backward connection, to which, in said event, output of said at least an additional channel, after demultiplexing by said additional demultiplexer and multiplexing by an additional multiplexer, is to be routed.

3. The node system of claim 2, further comprising, coupled to the deinterleaving means, at least one other input terminal without backward connection, to which, in the event the system is expanded to provide the other backward connection, output of at least another additional channel, after demultiplexing by another additional demultiplexer and multiplexing by another additional multiplexer, is to be routed.

4. The node system of claim 3, further comprising, coupled to the interleaving means, at least one other output terminal without forward connection, to which, in said event the system is expanded to provide the other backward connection, said output of at least another additional channel, after said demultiplexing by another additional demultplexer and said multiplexing by another additional multiplexer, to be routed.

5. The node system of claim 1, further comprising, coupled to the interleaving means, another output terminal without forward connection, to which output of at least another additional channel for another additional, interleaved optical signal is to be coupled, for future connection of said another output terminal to another additional demultiplexer in the event the system is expanded so as to provide the forward connection for said another output terminal.

6. A node system for increasing the-capacity of a wavelength division multiplexing (WDM) system, said node system comprising: means for interleaving a plurality of optical signals received therein into a predetermined number of channels having respective outputs, said means having at least one preliminary output terminal for respectively outputting an output of said outputs; a plurality of demultiplexers respectively coupled to others of said outputs and for demultiplexing the respective channel into a prescribed number of channels; a plurality of multiplexers for multiplexing the respective demultiplexed optical signals from said plurality of demultiplexers; means for deinterleaving said optical signals outputted from said plurality of multiplexers, the output of said deinterleaving to be forwarded to a next node; at least one up grading demultiplexer for respectively demultiplexing the optical signals outputted from said at least one preliminary output terminal; and at least one upgrading multiplexer for multiplexing the demultiplexed optical signal outputted from the respective upgrading demultiplexer, wherein the preliminary output terminal is without forward connection, is for outputting at least an additional channel for an additional, interleaved optical signal, and is coupled, to a respective demultiplexer of the at least one upgrading demultiplexer in the event the system is expanded so as to provide said forward connection.

7. The node system of claim 6, further comprising, coupled to the deinterleaving means, an input terminal without backward connection, to which, in said event, output of said at least an additional channel, after demultiplexing by said additional demultiplexer and multiplexing by an additional multiplexer, is to be routed.

8. The node system of claim 7, further comprising, coupled to the deinterleaving means, at least one other input terminal without backward connection, to which, in the event the system is expanded to provide the other backward connection, output of at least another additional channel, after demultiplexing by another additional demultiplexer and multiplexing by another additional multiplexer, is to be routed.

9. The node system of claim 8, wherein said at least one preliminary output terminal, said at least one upgrading demultiplexer, and said at least one upgrading multiplexer comprise, correspondingly, at least two preliminary output terminals, at least two upgrading demultiplexers, and at least two upgrading multiplexers.

10. The node system of claim 6, wherein said at least one preliminary output terminal, said at least one upgrading demultiplexer, and said at least one upgrading multiplexer comprise, correspondingly, at least two preliminary output terminals, at least two upgrading demultiplexers, and at least two upgrading multiplexers.

11. A method for increasing the capacity of a wavelength division multiplexing (WDM) system of the type having a pair of interleaver and deinterleaver and at least one pair of multiplexer and demultiplexer disposed between said interleaver and said deinterleaver, the method comprising the steps of: upon receiving a plurality of optical signals from different sources by said interleaver, interleaving said received optical signals into a predetermined number of channels; demultiplexing, by said demultiplexer, said interleaved optical signals received from the respective said predetermined channel into a prescribed number of channels; multiplexing, by said multiplexer, said demultiplexed optical signals received from the respective said prescribed channel of said demultiplexer; deinterleaving said multiplexed optical signals into one transmission channel to be forwarded to a next node; and, providing the interleaver with an output terminal without forward connection, to which output of at least an additional channel for an additional, interleaved optical signal is to be coupled, for future connection of the terminal to an additional demultiplexer in the event the system is expanded so as to provide said forward connection.

12. The method of claim 11, further comprising the step of providing the deinterleaver with an input terminal without backward connection, to which, in said event, said output of at least an additional channel, after demultiplexing by said additional demultiplexer and multiplexing by an additional multiplexer, is to be routed.

13. The method of claim 12, further comprising the step of providing the deinterleaver with at least one other input terminal without backward connection, to which, in the event the system is expanded to provide the other backward connection, output of at least another additional channel, after demultiplexing by another additional demultiplexer and multiplexing by another additional multiplexer, is to be routed.

14. The method of claim 13, further comprising the step of providing the interleaver with at least one other output terminal without forward connection, to which, in said event the system is expanded to provide the other backward connection, said output of at least another additional channel, after said demultiplexing by another additional demultiplexer and said multiplexing by another additional multiplexer, is to be routed.

15. The method of claim 11, further comprising the step of providing the interleaver with another output terminal without forward connection, to which output of at least another additional channel for another additional, interleaved optical signal is to be coupled, for future connection of said another output terminal to another additional demultiplexer in the event the system is expanded so as to provide the forward connection for said another output terminal.

* * * * *